United States Patent
Ansell

(10) Patent No.: US 12,206,486 B1
(45) Date of Patent: Jan. 21, 2025

(54) NON-TERRESTRIAL COMMUNICATION SESSIONS

(71) Applicant: Amazon Technologies, Inc., Reno, NV (US)

(72) Inventor: Nicholas Anthony Ansell, Macclesfield (GB)

(73) Assignee: Amazon Technologies, Inc., Reno, NV (US)

( * ) Notice: Subject to any disclaimer, the term of this patent is extended or adjusted under 35 U.S.C. 154(b) by 403 days.

(21) Appl. No.: 17/673,402

(22) Filed: Feb. 16, 2022

(51) Int. Cl.
*H04W 76/00* (2018.01)
*H04B 7/185* (2006.01)
*H04L 67/02* (2022.01)
*H04W 28/06* (2009.01)
*H04W 76/12* (2018.01)

(52) U.S. Cl.
CPC ......... *H04B 7/18513* (2013.01); *H04L 67/02* (2013.01); *H04W 28/065* (2013.01); *H04W 76/12* (2018.02)

(58) Field of Classification Search
CPC ............... H04W 76/12; H04W 28/065; H04B 7/18513; H04L 67/02
See application file for complete search history.

(56) References Cited

U.S. PATENT DOCUMENTS

| | | |
|---|---|---|
| 2016/0337336 A1* | 11/2016 | Takayasu ............ H04L 63/0807 |
| 2016/0359629 A1* | 12/2016 | Nadathur ................. H04L 9/14 |
| 2021/0119898 A1* | 4/2021 | Lauer ...................... H04L 67/10 |

* cited by examiner

*Primary Examiner* — Erika A Washington
(74) *Attorney, Agent, or Firm* — Hogan Lovells US LLP

(57) ABSTRACT

HTTP/HTTPS communication between non-terrestrial objects and ground stations are enabled by splitting common HTTP/HTTPS proxy functions across two sides of a radio frequency (RF) communication link. An HTTP/HTTPS request may be generated and then transmitted across an RF communication downlink to a ground location, where the HTTP/HTTPS request may be analyzed to determine an appropriate endpoint. A connection is established with the endpoint to permit transmission of the request. In response to the request, the ground location may then take an HTTP/HTTPS response and transmit across an RF communication uplink to the non-terrestrial object.

20 Claims, 9 Drawing Sheets

NON-TERRESTRIAL COMMUNICATION SESSIONS

BACKGROUND

Terrestrial data protocols may operate by established guidelines and standards to provide for highly efficient, high bandwidth, low latency communications that enable various storage, compute, and communication applications. In contrast, non-terrestrial communication protocols are designed to accommodate high latency and low bandwidths, along with designated periods of time for communication due to orbital mechanics. As a result, transmission of information and data between terrestrial and non-terrestrial objects, or between non-terrestrial objects is expensive, time consuming, and complex. Due to these added complexities, developments of new applications for non-terrestrial objects is usually highly specialized and may require extensive modifications to existing systems or the generation of entirely new systems, which increases barriers to entry.

BRIEF DESCRIPTION OF THE DRAWINGS

Various embodiments in accordance with the present disclosure will be described with reference to the drawings, in which.

DETAILED DESCRIPTION

Figure 1:
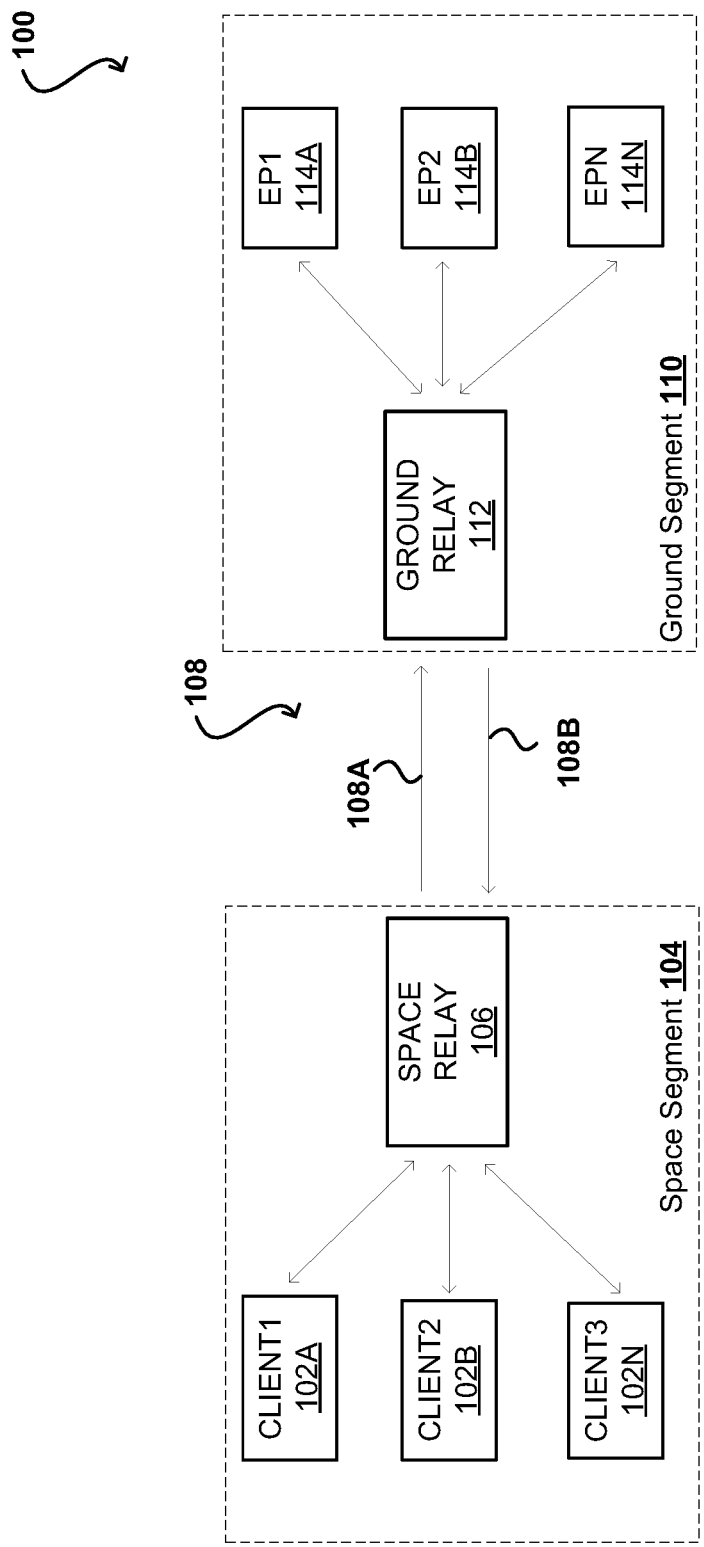
FIG. 1 illustrates an example architecture for non-terrestrial communications that can be utilized in accordance with various embodiments.

Approaches in accordance with various embodiments can be used for establishing data and communication connections, such as using the internet protocol suite (TCP/IP), with non-terrestrial objects, such as objects in space or in low-earth orbit (LEO), among other options. Embodiments may enable space networks to be established that permit hypertext transfer protocol (HTTP) and/or hypertext transfer protocol secure (HTTPS) sessions over TCP/IP when using other intermediate communication protocols, such as radio frequency (RF) communications. In at least one embodiment, RF links are utilized for upstream and downstream communications between a space relay (e.g., software executing on a non-terrestrial object) and a ground relay (e.g., software executing on a terrestrial object). Data transmitted across these links may be encapsulated and associated with a session identification (e.g., session ID) such that, upon receipt, different segments of communication packets can be analyzed, extracted, and provided to an appropriate endpoint. Thereafter, responses to various communications may be similarly encapsulated, associated with the session ID, and transmitted back to the initial requestor. In this manner, applications and services that operate using TCP/IP, such as various distributed compute, storage, or other systems, may be utilized with non-terrestrial objects, thereby simplifying development and use of these services.

In at least one embodiment, a non-terrestrial object (e.g., a satellite, a space vehicle, etc.) may include one or more clients that generate requests and/or receive responses for different operations. By way of example, applications executing on board a satellite may request computer services due to the relatively low processing capabilities on board a satellite. This request may be transmitted to a space relay, which may be a software package executing on board the satellite. The request may then be transmitted, along an RF link, to a ground relay, which may be a software package executing at a ground station. This ground relay may then determine an appropriate endpoint for the request, such as a compute service being offered as part of a distributed computing environment, and transmit the request for processing. Once complete, the ground relay may then transmit a response back to the satellite along an upstream RF link for receipt at the space relay. In at least one embodiment, the compute services may utilize existing architectures and protocols, where the requests and responses are only modified or otherwise adjusted for transmission, for use along the respective RF links.

Various embodiments may provide for request encapsulation and decapsulation and may further enable multi-session operations. For example, an initial request may be generated that includes a header. A session ID may be appended or otherwise added to the request, such as within the header, to identify a specific request, which may be associated with different clients utilizing a common space relay. A number of requests may all then be encapsulated into a packet for transmission down a single RF downlink channel to the ground relay. At the ground relay, the packet may be decapsulated, where the session IDs are read to enable forwarding of the requests to the appropriate end point. For responses, the process may be repeated, where each response is associated with the original session ID, encapsulated, transmitted as a packet over a single RF uplink channel, and then decapsulated and forwarded to the appropriate client.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

FIG. 1 illustrates an example architecture 100 which facilitates multiple bi-directional HTTP/HTTPS sessions over TCP/IP using one or more uni-directional RF channels. In this example, a client 102 may be associated with a space segment 104. The space segment 104 may refer to one or more components that are non-terrestrial or in space (e.g., low-earth orbit (LEO), medium-earth orbit (MEO), geosynchronous orbit (GEO), high-earth orbit (HEO), and the like). The space segment 104 in this example may further be described as a node, or a space node, that is associated with a component, such as a space vehicle or satellite, that may include one or more clients 102A-102N and a space relay 106. The clients 102A-102N may be configured to support the use of an HTTP/HTTPS proxy, which may be referred to as an HTTP proxy for simplicity. In at least one embodiment, the clients 102A-102N refer to components or features that may make one or more communication requests to a terrestrial service, as will be described below. For example, the clients 102A-102N may include sensors, processing components, or the like.

The illustrated space relay 106 may refer to a software package executing within the space segment 104, such as on individual nodes. For example, each object may include its own independent space relay 106. However, it should be appreciated that objects may include multiple space relays and/or may not include a space relay at all, but rather, may be in communication with a second object that includes a space relay. By way of example, an object may refer to a satellite that includes multiple sensors or applications that may each make requests to a common space relay associated with the satellite. As another example, the object may refer to a node that includes different components, such as components that make compute requests while others make storage requests, and the object may include multiple space relays, where certain clients communicate via a first space relay and other clients communicate via a second space relay. Additionally, in at least one embodiment, a first object may refer to a first satellite in a constellation of satellites that may make compute requests, but may transmit those requests to a second satellite that includes the space relay. Accordingly, it should be appreciated that a variety of configurations may be presented where clients 102A-102N are in communication with the space relay 106.

The space relay 106 may be associated with one or more RF transceivers to enable sending and receiving RF communications. As will be appreciated, RF communications in a non-terrestrial environment may have several challenges for efficient communications, such as increased latency, lower bandwidth, and potentially limited communication windows due to orbital mechanics or other atmospheric conditions. For example, the space segment 104 may only be in a position to communicate with a ground station for a particular period of time before its orbit around the Earth prevents further communication. Additionally, RF communication links may be one-way links where a first link is used for downstream communication and a second link is used for upstream communication.

In this example, RF communication links 108 are utilized for communications between the space segment 104 and a ground segment 110. In this example, the RF communication link 108A may be referred to as a downlink because it transmits data from the space segment 104 to the ground segment 110. In contrast, the RF communication link 108B may be referred to as an uplink because it transmits data from the ground segment 110 to the space segment 104. As will be described below, one or more of the requests from the clients 102A-102N may be serialized and encapsulated prior to transmission to the ground relay 112 via the RF communication link 108A. For example, separate requests may be packaged with a respective session ID in order to link the request to a particular client 102A-102N. The packet may then be transmitted to the ground segment 110 for receipt at the ground relay 112, which may be a software package executing at a facilitate associated with one or more services offered through a distributed computing environment.

The ground relay 112 may be used to decapsulate the packet of information received from the space relay 106. For example, individual requests may be separated, identified by their session IDs, and then provided to respective endpoints 114A-114N. These endpoints may represent products or services being offered by one or more providers, such as storage services, compute services, and the like. The endpoints may be HTTP/HTTPS endpoints that require little to no modification when compared to receiving requests from a terrestrial service. As a result, applications operating with the clients 102A-102N may be developed in a manner similar to or substantially the same as terrestrial applications because systems and methods of the present disclosure may enable data transmission from the space segment 104 to emulate or otherwise work with TCP/IP communications, even though non-TCP/IP protocols, for example those used in commonplace RF communication links 108 are utilized to transmit the information between the clients and the endpoints.

The endpoints 114A-114N may execute one or more operations responsive to the requests, such as compute operations or storage operations. The endpoints 114A-114N may provide responses to those requests, which may be transmitted back to the ground relay 112. As noted above, communication with the space segment 104 cannot be accomplished over TCP/IP, and as a result, the RF communication link 108B may be utilized. The ground relay 112 may similarly encapsulate the responses from the endpoints 114A-114N with associated session IDs and provide a packet of information for transmission to the space relay 106. The space relay 106 can then decapsulate the packet, separate out the responses, and direct the responses to the appropriate client 102A-102N using the session IDs to help route the communications. Accordingly, systems and methods enable services that may operate over TCP/IP, such as distributed environments, to be utilized with space communications with little or no configuration modifications to the clients.

Figure 2:
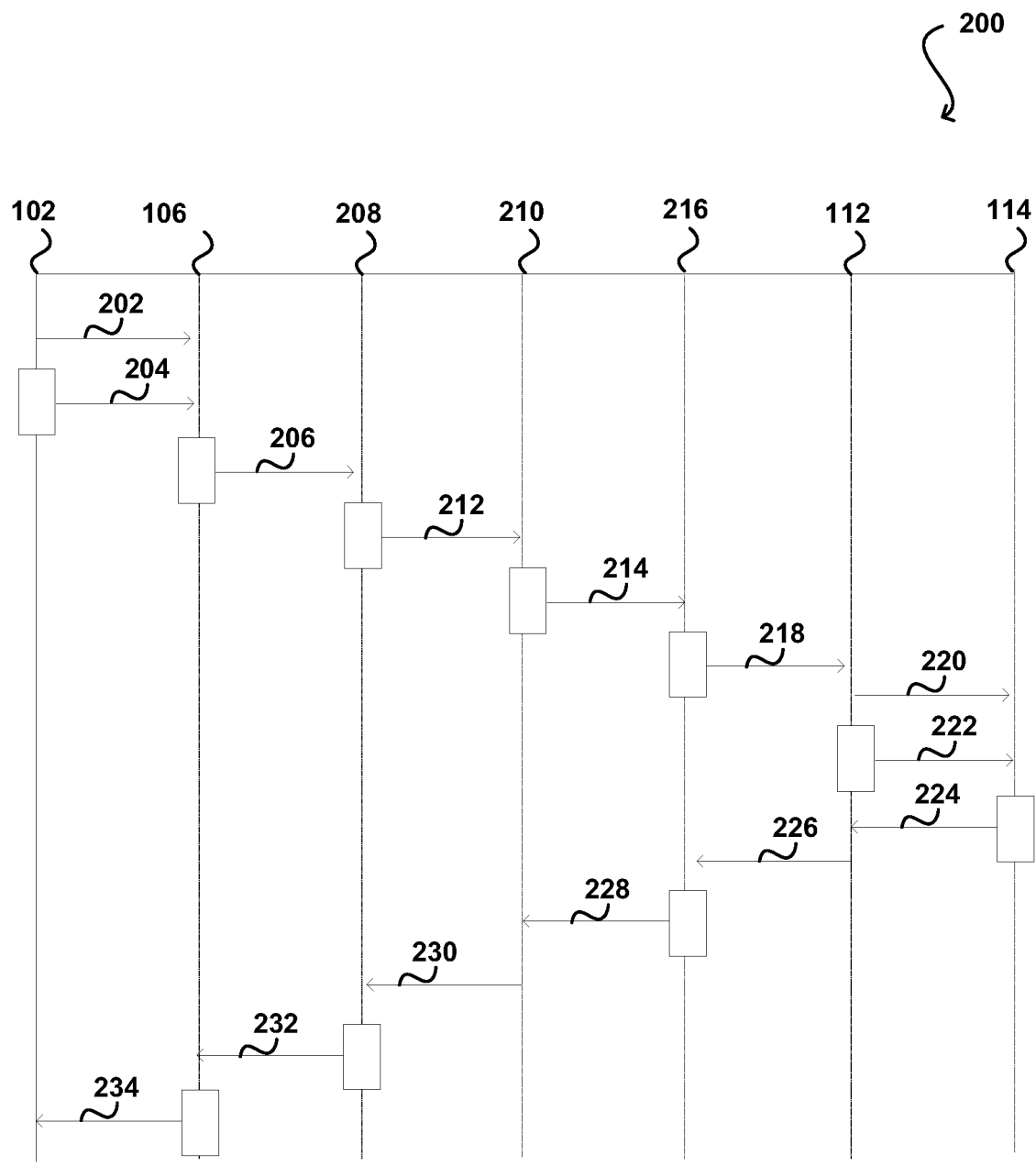
FIG. 2 illustrates an example process flow for establishing an HTTP/HTTPS session over TCP/IP that can be utilized in accordance with various embodiments.

FIG. 2 illustrates an example process flow 200 for communications between the space segment and the ground segment, which can be used with various embodiments. It should be appreciated that various additional steps may be included, but have been omitted for clarity with the present discussion. By way of example, various authorization steps (e.g., submission and verification of credentials), encryption/decryption steps, and the like may also be utilized with embodiments of the present disclosure. In this example, the process flow 200 illustrates both a downlink communication series (e.g., from a non-terrestrial object to a ground location) and an uplink communication series (e.g., from a ground location to a non-terrestrial object).

The client 102 may include a processor that is executing one or more programs associated with a distributed environment or other service associated with the endpoint 114. By way of example, the client 102 may include a process that is executing a compute operation to evaluate data acquired by one or more sensors also associated with the client 102. The software may, for example, be an edge runtime and/or cloud service for building, deploying, and managing device software, which may further enable local processing, messaging, data management, machine learning inference, and the like. This software service may be supported by one or more distributed service endpoints or tools that enable developers to build and manage software for various devices. As noted above, this service may operate using TCP/IP protocols, which may not be compatible for non-terrestrial systems. Accordingly, developers may resort to building, from scratch, applications for non-terrestrial objects, rather than leveraging the development community and systems associated with terrestrial applications. In this example, an HTTP/HTTPS session over TCP/IP is established 202 with the space relay 106. The connection may enable the object 102 to collect and then send packets 204, which may have a destination of the endpoint 114.

As noted above, the space relay 106 may be associated with one or more software applications that are executing associated with a non-terrestrial object, such as a satellite, vehicle, or the like. The space relay 106 may be utilized to encapsulate the packets received from the client 102 for transmission 206 to a transceiver 208. In various embodiments, numerous packets may be serialized and provided within a single packet, where different portions are assigned a session ID to enable routing to appropriate endpoints. The space relay 106 may maintain a data store that includes a table or other record of transmissions and their associated session IDs. In this example, the transceiver 208 is an RF transceiver that enables communication between a non-terrestrial object and a ground station 210, which may include its own RF transceiver. The RF transceiver 208 may further include software systems that add various coding, encryption protocols, and the like prior to transmission 212 to the ground station 210.

The transmission may be received at the ground station 210 and processed for use by various terrestrial systems. For example, the received packet may be down-converted and digitized prior to transmission 214 to a software-defined radio (SDR) 216. The SDR may be executing within one or more cloud applications, and may be a server-based or serverless application. The SDR may demodulate and decode the transmission prior to sending 218 the transmission to the ground relay 112. The ground relay 112 may also be a software package, as noted above. The ground relay 112 may establish a TCP/IP session 220 with the endpoint 114, where the session may be a new session or may be a continuation of a previous session. The ground relay 112 may then extract the packet of information, identify the appropriate endpoint 114 using the session IDs, and then transmit the information 222 to the appropriate endpoint 114.

In at least one embodiment, the endpoint 114 is associated with a service offered through a provider, such as a cloud service that may be server-based or serverless, where operations such as compute or storage operations are executed in response to requests received from authorized parties. In this example, the endpoint 114 may execute the request received from the ground relay 112 and provide, a response 224 to the ground relay 112. As noted above, the ground relay 112 may perform one or more operations to encapsulate, serialize, and/or associate different packets with a particular client, such as by adding the session ID to the appropriate response. The ground relay 112 may then send the packet 226 to the SDR 216, for further processing. By way of example, the SDR 216 may add coding and modulation to the packet prior to transmission 228 to the ground station 210.

In this example, the ground station 210, which as noted above may include an RF transceiver, may transmit 230 the packet back to the object for receipt at the RF transceiver 208. Various embodiments may include certain processing steps at the RF transceiver 208, such as demodulating and decoding the packet, prior to transmission 232 to the space relay 106. The space relay 106 may then extract the response, associate the response with the appropriate client via the session ID, and then transmit the response 234 to the client 102. Accordingly, various embodiments of the present disclosure enable HTTP/HTTPS sessions to be established between a non-terrestrial client and an endpoint associated with a ground station. This session may be maintained even though RF communication links are utilized for data transmission, such as by including various timeouts to artificially keep the session open and/or to close the session after a certain period of time. These timeouts may be particularly selected based on various operating conditions and may, over time, be associated with particular operations such that one or more known operations may have a particular timeout range while others have a different timeout range.

It should be appreciated that connections established with embodiments of the present disclosure may include encryption protocols to provide end-to-end security of data. By way of example, transport layer security (TLS) may be utilized with embodiments of the present disclosure. TLS may utilize a handshake with a formal opening and closing of the connection. For example, a client may transmit a "hello" message and the endpoint may also transmit a "hello" message. A certificate authority may verify the client and endpoint to establish the session, which may lead to the formation of session keys. At the end of the session, a formal closing message may be transmitted. However, if the communication is already closed, the message will not reach its destination. Various embodiments of the present disclosure may determine whether a request to close a session has been received for a session that no longer exists, for example due to timing out. If such a request is received, the system may instruct the sender to close out the session due to the expiration of the session.

Figure 3:
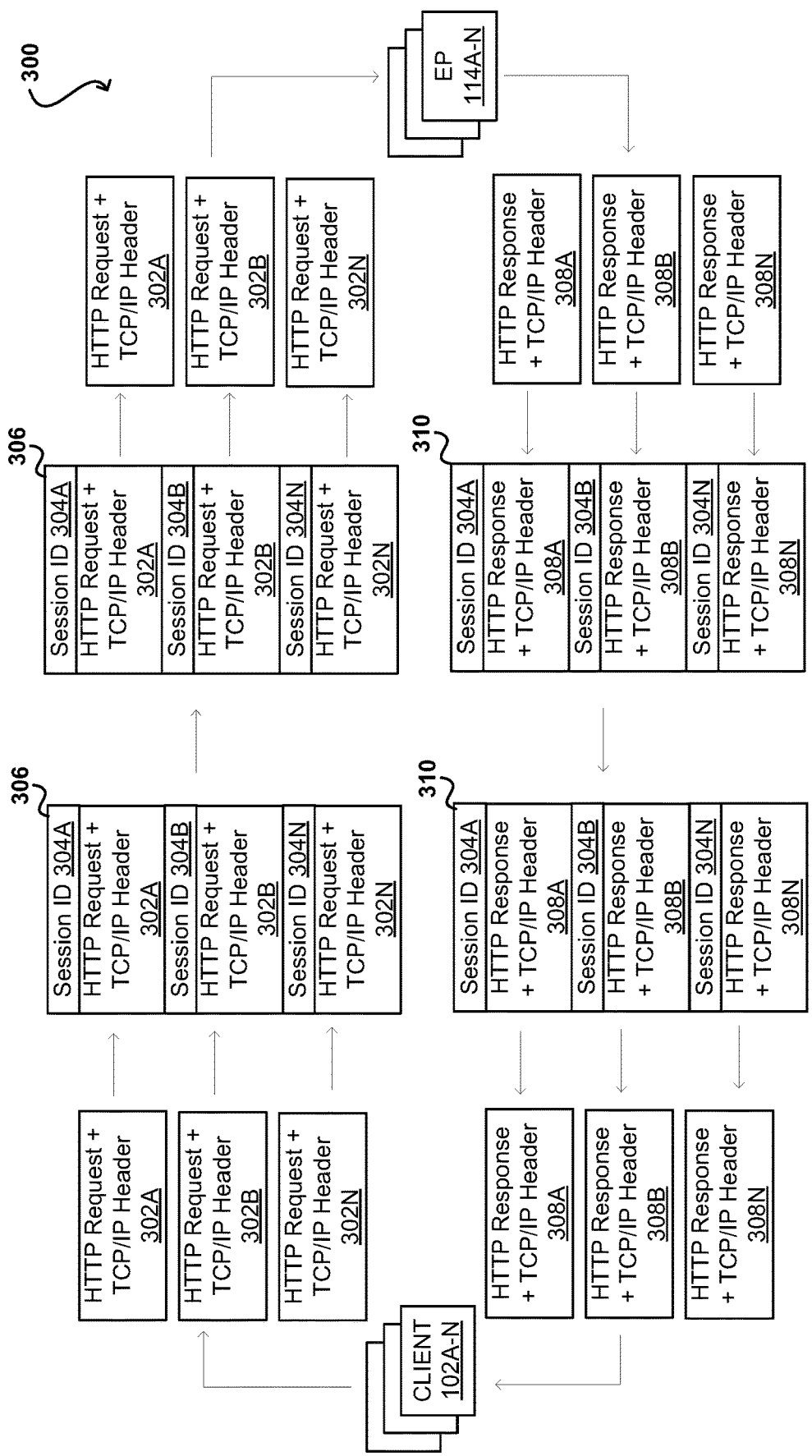
FIG. 3 illustrates an example process flow for multi-session HTTP/HTTPS request encapsulation and decapsulation that can be utilized in accordance with various embodiments.

FIG. 3 illustrates an example process flow 300 for a multi-session HTTP/HTTPS request encapsulation and decapsulation in accordance with various embodiments of the present disclosure. As noted above, components of the requests may be referred to as HTTP requests or HTTP endpoints for simplicity, but it should be appreciated that any recitation of HTTP may also be utilized with HTTPS. In this example, a set of HTTP/HTTPS requests are transmitted to one or more destination HTTP/HTTPS endpoints via an HTTP/HTTPS proxy, which in this example is the space relay. For example, the clients 102A-102N may be HTTP/HTTPS clients that send one or more HTTP/HTTPS requests 302. These HTTP/HTTPS requests 302 may include both the request (e.g., a request for a compute service, a request for a memory service, a request to access some resource, etc.) and a TCP/IP header, which may include the delivery address for the request and its sender. The requests 302 may be received at the space relay 106, which may serve as an HTTP/HTTPS proxy, and add a respective session ID 304 to each of the requests 302. In this example, each of the requests 302A-302N are serialized as a single packet 306 that may be transmitted along a single RF downlink connection to the ground relay 112.

The ground relay 112 may receive the packet 306 and then, using the respective session IDs 304, identify new or existing in-bound requests. For example, an existing request may be open, and may have been maintained open, such that the associated request 302 may then be forwarded to the appropriate endpoint 114. In at least one embodiment, a destination endpoint is determined by decoding the HTTP/HTTPS requests 302. For example, the ground relay 112 resolves the DNS name of the destination endpoint to an IP address and then acts as a reverse proxy and makes the connection request on behalf of the HTTP/HTTPS client 102. As shown, the session ID 304 may be removed before sending the HTTP/HTTPS request 302. Thereafter, the endpoints 114 (e.g., destination endpoints) may receive the respective requests.

Various requests 302 may be for information or services from the endpoint 114, and as a result, HTTP/HTTPS responses 308 (e.g., responses) are generated. As previously indicated, the responses 308, much like the requests 302, include the HTTP/HTTPS response and a TCP/IP header. The ground relay 110, much like the space relay 106 can serialize and package the responses 308 into a response packet 310. In at least one embodiment, the ground relay 110 matches the responses 308 to a session using the TCP client/server session and adds the appropriate session ID 304 to the responses 308. The packet 310 may then be transmitted back to the space relay 106, for example using a single RF uplink channel.

In a substantially similar operation as the transmission of the request, the space relay 106 may match the respective responses 308 to the appropriate clients 102. The session ID may then be removed and the responses 308 may be sent to the appropriate clients 102 using the original TCP client/server session between the clients 102 and the space relay 106. From there, the clients 102 may receive the HTTP/HTTPS response from the HTTP/HTTPS endpoints 114. Further requests and responses may follow a similar operation.

Figure 4:
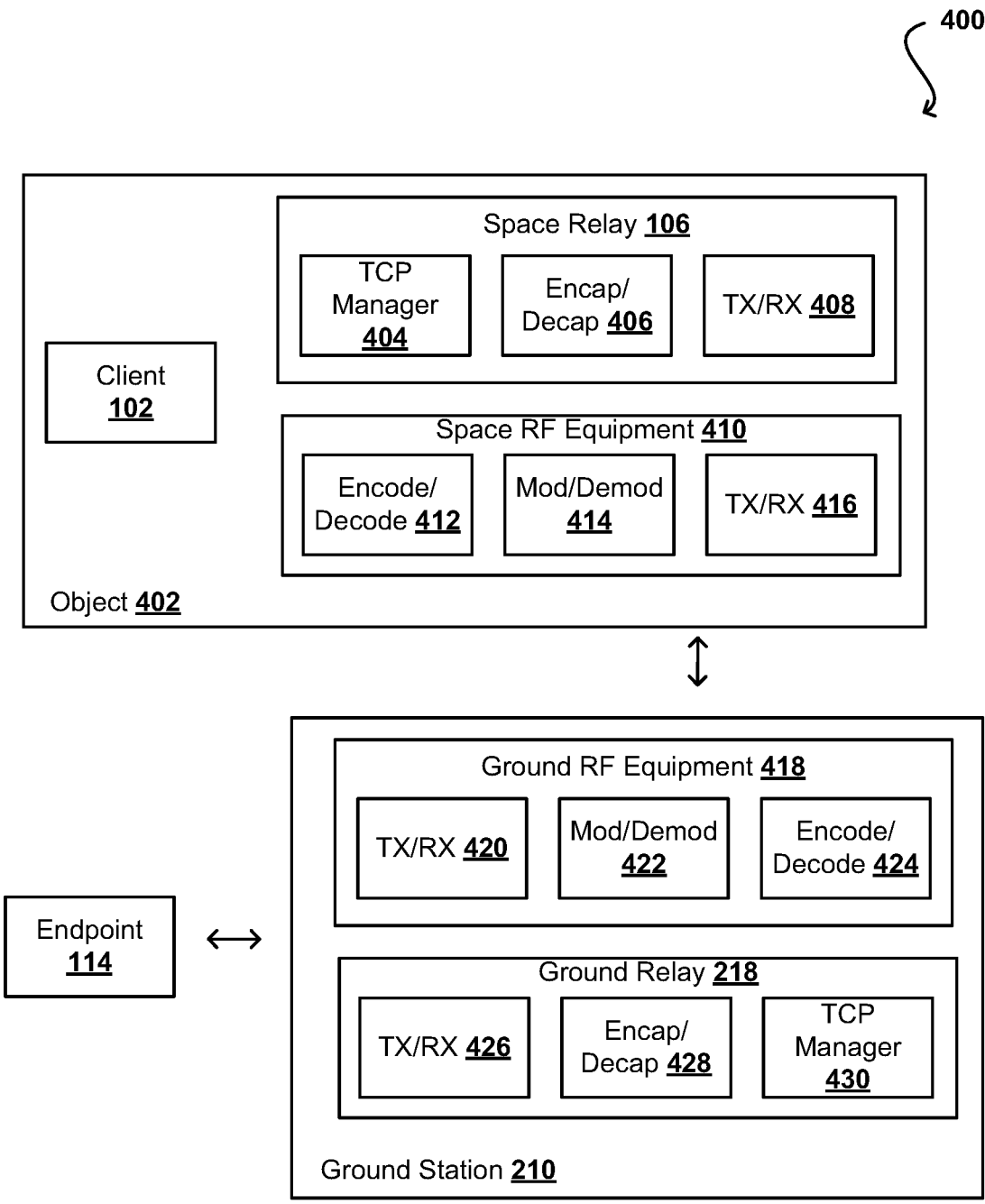
FIG. 4 illustrates an example architecture for non-terrestrial communications that can be utilized in accordance with various embodiments.

FIG. 4 illustrates an example architecture 400 in which embodiments of the present disclosure may be implemented. It should be appreciated that certain components have been removed for clarity. Moreover, while various components may be illustrated as being subsets of others, in various other embodiments such components may be associated with different features or may be accessible to, but not a part of, various other components. In this example, a non-terrestrial object 402 is illustrated as forming a part of the architecture 400, where the object 402 may include a satellite, a vehicle, or the like. In various embodiments, the object 402 includes the client 102, which may include one or more components that may be utilized to submit an HTTP/HTTPS response to one or more associated endpoints. The client 102 may include or be associated with on-board processing of the object 402, where the processor may be particularly specified for use in non-terrestrial applications. These processors may be radiation tolerant, among other factors, but may have reduced processing capabilities when compared to processors used in terrestrial processors, such as various CPUs or GPUs utilized with data center applications, personal computers, and other applications.

The space relay 106 may include software that executes on board the object 402, such as on a processor, which may be the same processor or a different processor from the client 102. In this example, the space relay 106 may enable interaction with various ground endpoints by serving an as HTTP/HTTPS proxy to enable TCP/IP communications, even across a higher latency, lower bandwidth connection, such as an RF communication link. The space relay 106 may include a TCP Manager 404, an encapsulation/decapsulation module 406, and an equipment transceiver 408. Various embodiments include encapsulation and decapsulation of TCP/IP traffic between RF equipment 410 and the client 102. As noted above, the space relay 106 may be used to establish an HTTP/HTTPS, to add session IDs to requests, and then to transmit the information to distribution over one or more RF communication links.

In this example, the RF equipment 410 may include an encoding/decoding module 412, a modulation/demodulation module 414, and a space channel transceiver 416. In operation, the RF equipment 410 may conduct uplink and downlink transmissions using one or more RF networks to interact with the ground station 210.

As previously noted, packets of information may be encapsulated and then sent via a downlink RF communication to the ground station 210, where the transmission is received at ground RF equipment 418. The ground RF equipment 418 may include a ground channel transceiver 420, a modulation/demodulation module 414, and a encoding/decoding module 424, which may execute similar functions as that of the space RF equipment 410 in order to prepare received transmissions for the ground relay 218 and/or to prepare packets for transmission to the object 402. The illustrated ground relay 218 also includes a transceiver 426, an encapsulation/decapsulation module 428, and a TCP manager 430, which as noted above, may facilitate with preparing requests and/or responses. For example, the ground relay 218 may facilitate TCP/IP transmissions between the ground station 210 and the object 402 and prepare transmissions prior to transmission to the endpoint 114. As noted above, such a configuration reduces or eliminates specific customizations or changes to the client 102 and/or the endpoint 114 and enables operations to execute with traditional TCP/IP protocols, thereby increasing the number of applications that may be utilized in space without totally reworking or reconfiguring these applications to address the specific challenges of space communications.

Various embodiments of the present disclosure may enable real-time or near-real time analysis and operations for non-terrestrial objects, such as satellites. By way of example, a satellite may be associated with an earth observation company. The satellite may include one or more sensors to generate information, such as data representing visible or non-visible light for a portion of the earth. However, due to cloud coverage, a percentage of this data may not include useable or relevant information. Due to the reduced processing capabilities of processors associated with non-terrestrial objects, the data may not be processed prior to transmission to a ground station, which may be time consuming and expensive. Embodiments of the present disclosure may enable one or more applications to process data prior to transmission of the information back to the ground station. For example, one or more machine learning models may evaluate images to determine whether cloud coverage exceeds a threshold percentage and may discard those images that are not useable due to cloud coverage. As a result, a reduced number of images may be transmitted, thereby reducing costs for the operators. Moreover, in embodiments, one or more image masks of areas of the sensor data—detected by a machine learning model running on the satellite—to contain clouds may be generated in order to enable improved compression of different images, which may also enable reduced transmission costs without discarding entire images.

In at least one embodiment, systems and methods may be deployed to enable non-terrestrial objects, such as satellites, to establish navigational trajectories, such as to avoid debris. For example, compute operations may be requested using embodiments of the present disclosure in order to calculate a desired location or trajectory for the satellite in order to avoid debris. Compute operations may also be enabled to calculate the operation required for onboard control systems to position a satellite in a desired location or trajectory to avoid debris. As noted above, these compute operations may not undergo significant modifications when compared to terrestrial applications due to the ability to form HTTP/HTTPS proxies on each side of the RF communication link, thereby increasing the available pool of developers with the required knowledge to develop such applications and also reducing specialization for developers wanting to work on space applications.

In at least one embodiment, systems and methods may be used to facilitate communications nodes in the space segment. By way of example, processes may be implemented to enable inter-satellite communication or for satellite to lunar base communications. For example, a first space relay associated with a first node may communicate, for example via an RF communication link, with a second space relay associated with a second node. This second space relay may then be used as an intermediary to establish communication with a ground relay or to communicate back to the first node.

In at least one embodiment, communications are formed between a processor executing in a space segment to one or more processors executing on a ground segment. As noted above, a proxy for HTTP/HTTPS may be split on either side of a communication signal, such as RF or optical, among other options. However, it should be appreciated that embodiments may also be directed toward inter-node communications, as noted above. For example, inter-node communication may refer to different components that both operate within the space segment, such as a processor executing on a satellite in communication with an endpoint on another satellite. Moreover, it should be appreciated that embodiments are directed toward inter-node communication where a processor is executing on a satellite, a node is acting as a proxy, and the endpoint may be at a ground station or other station, such as a planetary station (e.g., lunar station). Accordingly, various embodiments may be utilized to facilitate communications where a physical medium change between nodes is present by utilizing the proxy-based solution of splitting the proxy on each side of the communication channel.

Figure 5A:
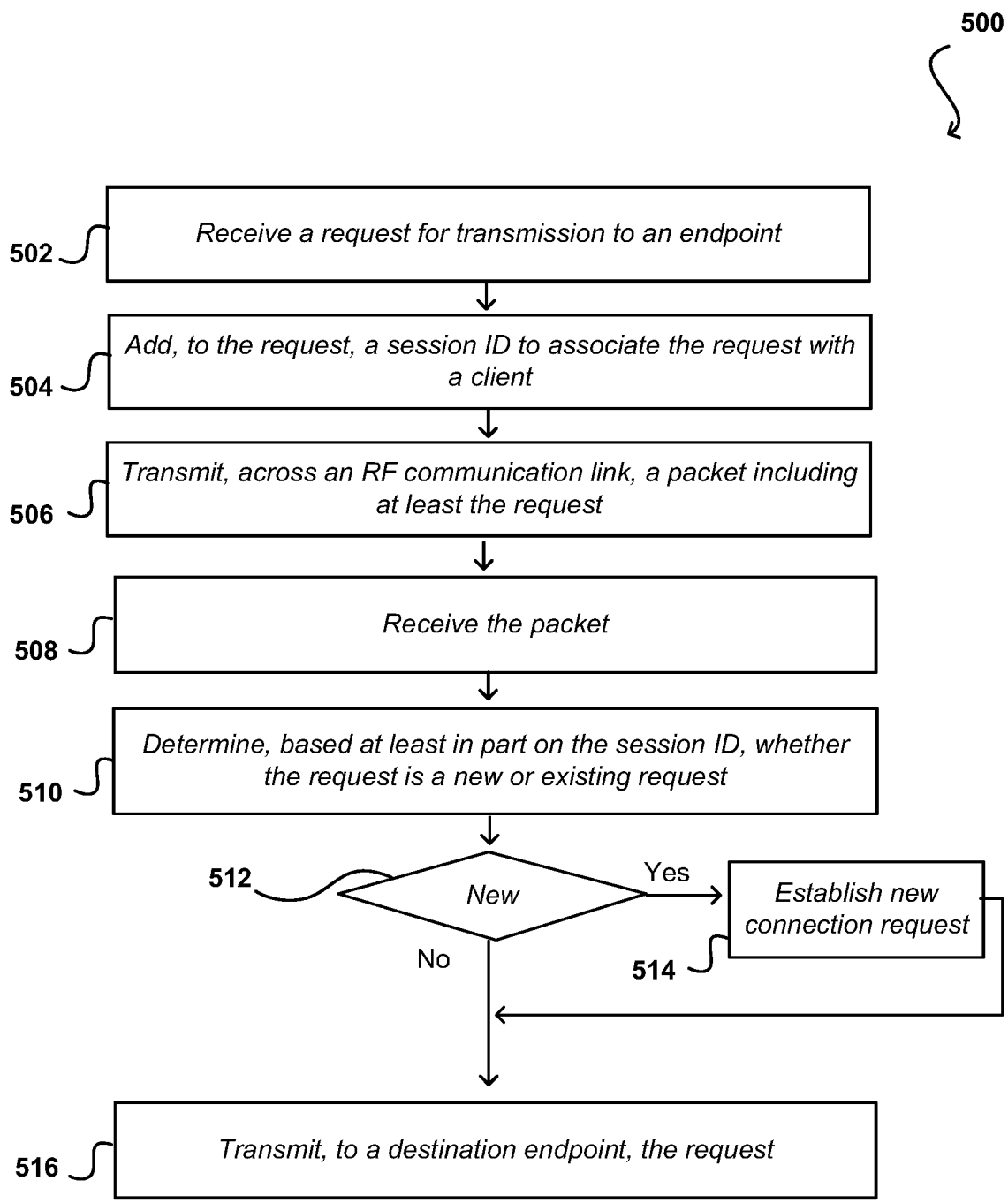
FIG. 5A illustrates an example process for transmitting a request to an endpoint that can be utilized in accordance with various embodiments.

FIG. 5A illustrates an example process 500 for establishing a TCP/IP connection between a non-terrestrial object and a ground station that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request for transmission to an endpoint is received 502. The request may be generated by a client, such as a client associated with a non-terrestrial object, such as a satellite or a vehicle. The client may be an HTTP/HTTPS client that transmits an HTTP/HTTPS request to a destination HTTP/HTTPS endpoint. The request may be received at a space relay, which may serve as an HTTP/HTTPS proxy for transmission of the request. A session ID is added to the request 504, which may be used to associate the request with a particular client. As described herein, the session ID may be used to later provide a response to the appropriate client.

In at least one embodiment, a packet is generated that include may include a set of requests. The packet is then transmitted, via an RF communication link 506 and received at a ground station 508. Various embodiments include processing of the packet, for example to determine whether the request is a new or existing request 510. If the request is determined to be a new request (e.g., not part of an existing TCP/IP connection), then a new connection request is established 514. If the request is an existing request, the request may be transmitted to a destination endpoint 516. In various embodiments, the endpoint is determined, at least in part, by the session ID. Thereafter, the endpoint may execute one or more operations or commands responsive to the request.

Figure 5B:
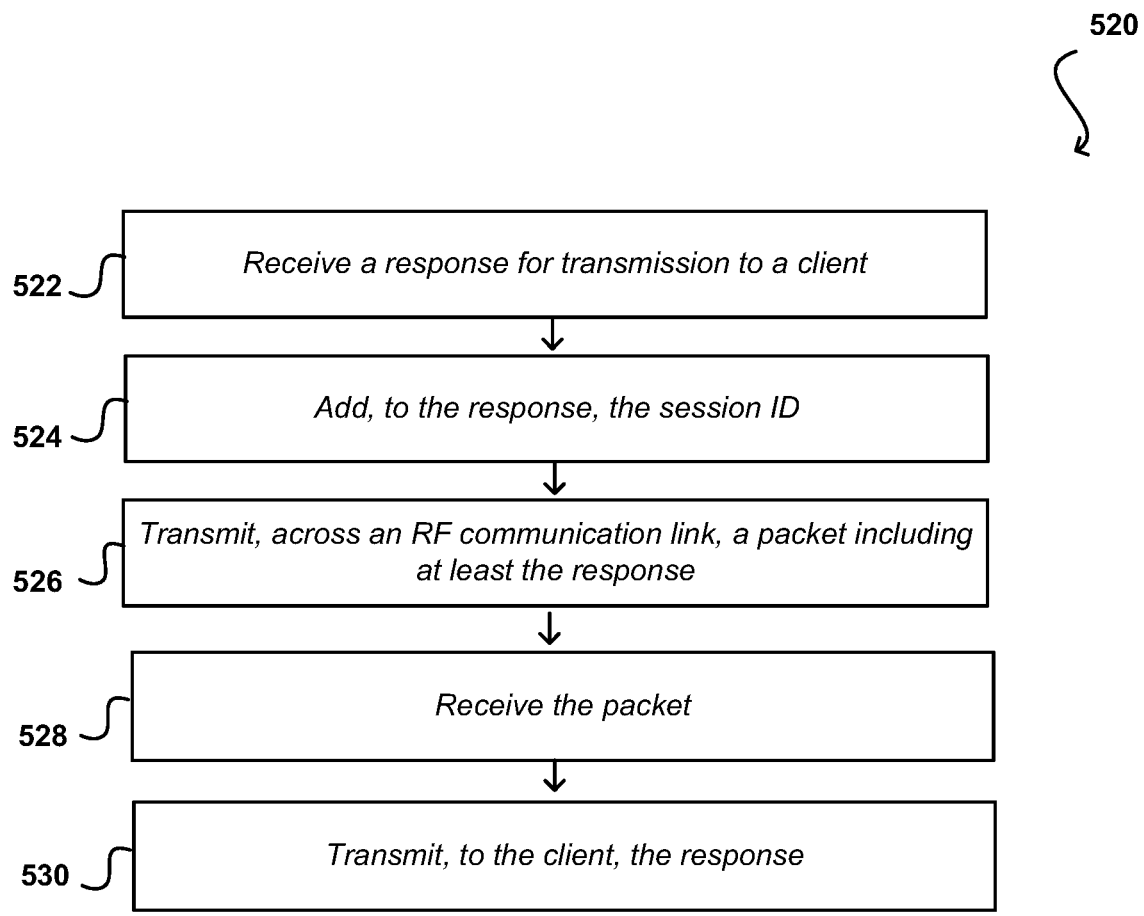
FIG. 5B illustrates an example process for transmitting a response to a client that can be utilized in accordance with various embodiments.

FIG. 5B illustrates an example process 520 for responding, across a TCP/IP connection, to a non-terrestrial object from a ground station that can be utilized in accordance with various embodiments. In this example, a response for transmission to a client is received 522. The response may be generated by an endpoint responsive to a request received from the client. The client may be an HTTP/HTTPS client that transmits an HTTP/HTTPS request to a destination HTTP/HTTPS endpoint. The response may be received at a ground relay that adds a previously received session ID the response 524.

In at least one embodiment, a packet is generated that include may include a set of responses. The packet is then transmitted, via an RF communication link 526 and received at a space relay 528. Various embodiments include processing of the packet prior to transmitting the response to a client 530. In various embodiments, the client is determined, at least in part, by the session ID.

Figure 6:
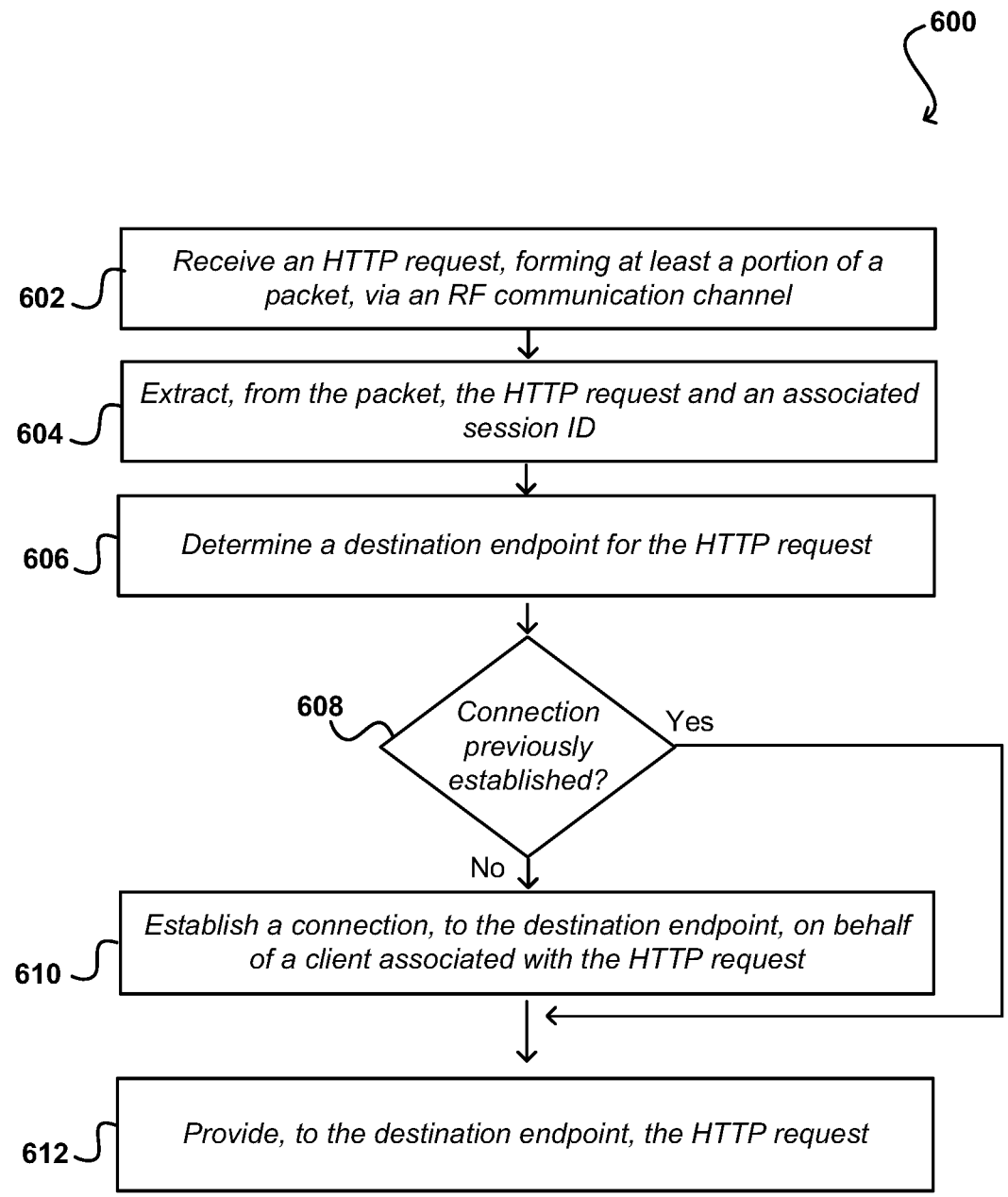
FIG. 6 illustrates an example process for establishing an HTTP/HTTPS session that can be utilized in accordance with various embodiments.

FIG. 6 illustrates an example process 600 for directing a request to destination endpoint. In this example, an HTTP/HTTPS request is received 602. In various embodiments, the HTTP/HTTPS request forms a portion of packet that is transmitted via an RF communication channel. For example, the RF communication channel may be between a non-terrestrial object and a ground station, where the HTTP/HTTPS request is serialized and encapsulated with other requests. The HTTP/HTTPS request and an associated session ID may be extracted from the packet 604. For example, various processing steps may be utilized in order to separate the HTTP/HTTPS request from other requests in the packet and then to utilize the session ID to identify an appropriate communication channel, endpoint, or the like. A destination endpoint may be determined 606, such as by resolving the DNS name of the destination endpoint to an IP address. In various embodiments, one or more TCP managers may attempt to keep sessions open for as long as required and/or for a designated period of time. As a result, different requests or responses may be associated with an existing connection that has been maintained from an existing session. In at least one embodiment, it is determined whether a connection was previously established 608. This determination may also include determining whether the connection is still open and/or maintained. That is, the determination may be related to determining whether an existing session is available for use. If not, a connection is established between the destination endpoint and a ground relay on behalf of a client that generated the request 610, thereby forming a reverse proxy. The HTTP/HTTPS request may then be transmitted along this connection 612. If the connection was previously established, the HTTP/HTTPS request may be transmitted along the previously established connection.

Figure 7:
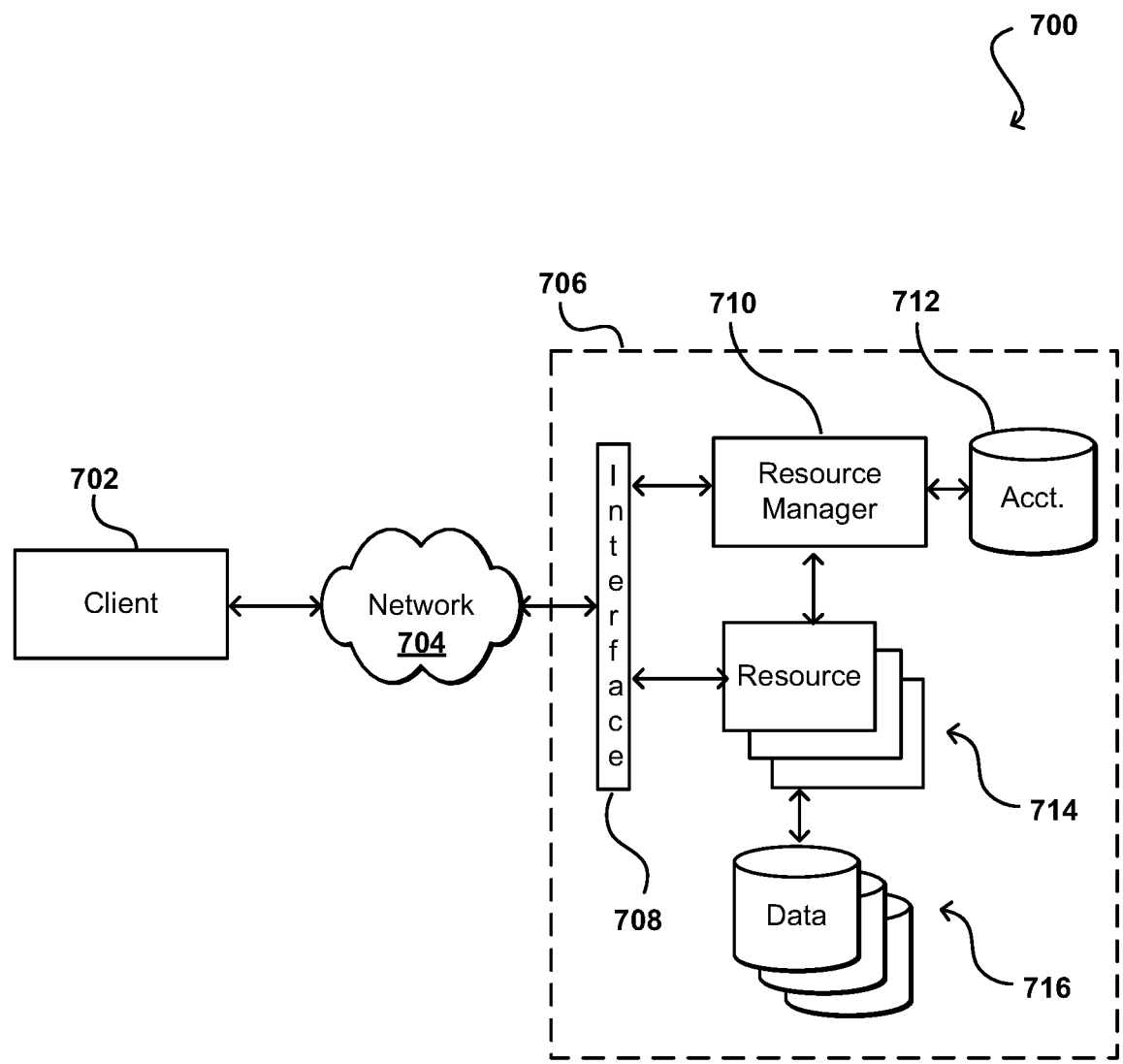
FIG. 7 illustrates components of an example resource environment in which aspects of various embodiments can be implemented.

FIG. 7 illustrates an example environment 700 in which aspect of various embodiments can be implemented. Such an environment can be used in various embodiments to provide resource capacity for one or more users, or customers of a resource provider, as part of a shared or multi-tenant resource environment. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via one or more wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 706 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
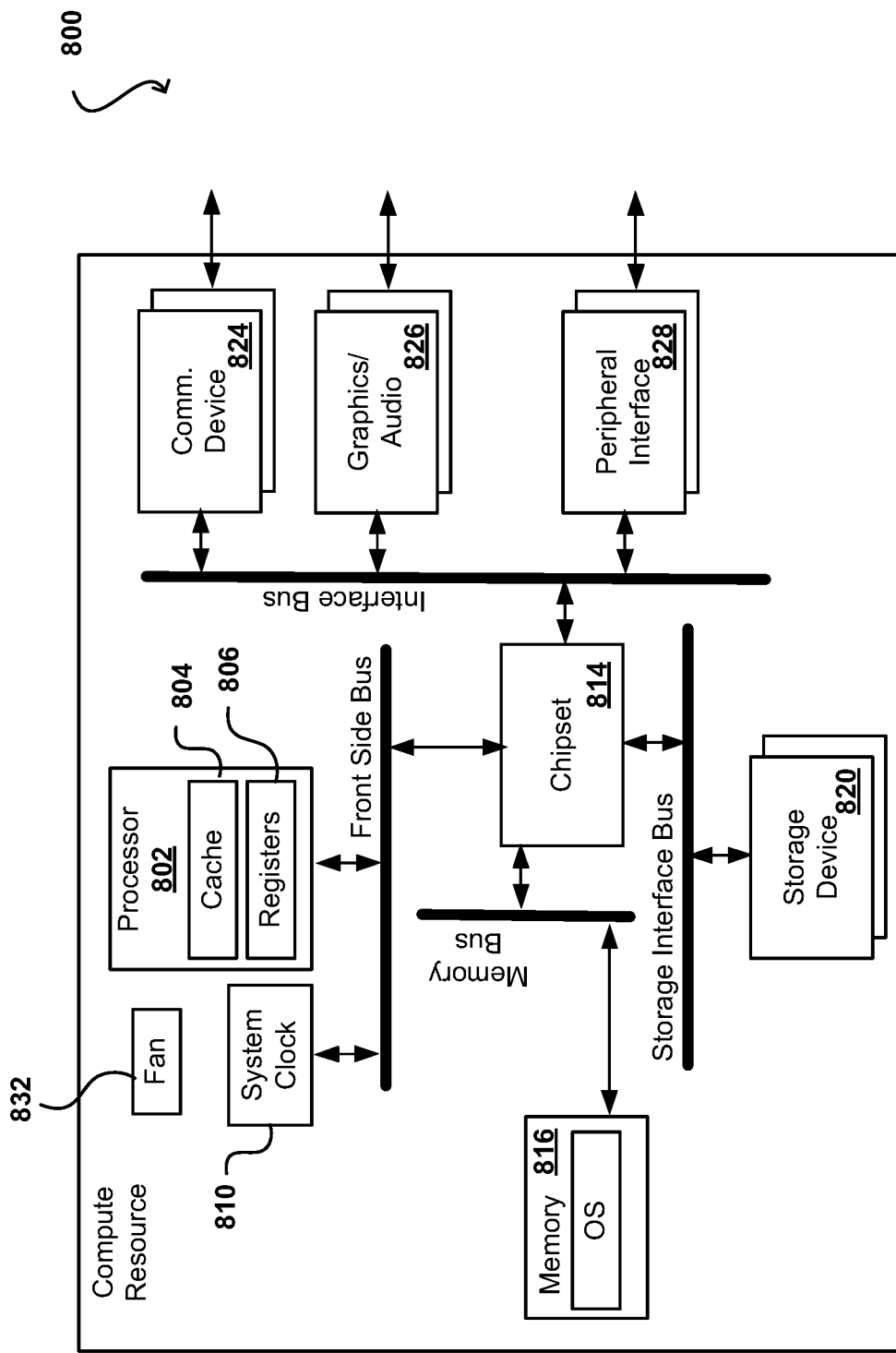
FIG. 8 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 8 illustrates components of an example computing resource 800 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 800 (e.g., a desktop or network server) will have one or more processors 802, such as central processing units (CPUs), graphics processing units (GPUs), and the like, that are electronically and/or communicatively coupled with various components using various buses, traces, and other such mechanisms. A processor 802 can include memory registers 806 and cache memory 804 for holding instructions, data, and the like. In this example, a chipset 814, which can include a northbridge and southbridge in some embodiments, can work with the various system buses to connect the processor 802 to components such as system memory 816, in the form or physical RAM or ROM, which can include the code for the operating system as well as various other instructions and data utilized for operation of the computing device. The computing device can also contain, or communicate with, one or more storage devices 820, such as hard drives, flash drives, optical storage, and the like, for persisting data and instructions similar, or in addition to, those stored in the processor and memory. The processor 802 can also communicate with various other components via the chipset 814 and an interface bus (or graphics bus, etc.), where those components can include communications devices 824 such as cellular modems or network cards, media components 826, such as graphics cards and audio components, and peripheral interfaces 828 for connecting peripheral devices, such as printers, keyboards, and the like. At least one cooling fan 832 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 802 can obtain data from physical memory 816, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 804 in at least some embodiments. The computing device 800 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 828, a communication device 824, a graphics or audio card 826, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 802 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP/HTTPS servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, at a hypertext transfer protocol/hypertext transfer protocol secure (HTTP/HTTPS) proxy, an HTTP/HTTPS request associated with a client;
   generating a transmission and routing packet including at least the HTTP/HTTPS request and a session identifier (ID) for the HTTP/HTTPS request;
   transmitting, along a downstream radio frequency (RF) communication channel, the packet;
   determining, at an HTTP/HTTPS reverse proxy, an endpoint for the HTTP/HTTPS request;
   forming a connection to the endpoint on behalf of the client; and
   transmitting, to the endpoint, the HTTP/HTTPS request.

2. The computer-implemented method of claim 1, further comprising:
   adding, to the HTTP/HTTPS request, the session ID.

3. The computer-implemented method of claim 2, further comprising:
   removing the session ID prior to transmitting the HTTP/HTTPS request to the endpoint.

4. The computer-implemented method of claim 1, wherein the HTTP/HTTPS proxy is associated with a non-terrestrial relay and the HTTP/HTTPS reverse proxy is associated with a ground relay.

5. The computer-implemented method of claim 1, further comprising:
   receiving a plurality of HTTP/HTTPS requests;
   encapsulating the plurality of HTTP/HTTPS requests into the transmission and routing packet.

6. The computer-implemented method of claim 1, further comprising:
   establishing a timeout value for the connection, the timeout value corresponding to a period of time to maintain the connection between one or more additional HTTP/HTTPS requests between the client and the endpoint.

7. The computer-implemented method of claim 1, wherein the HTTP/HTTPS proxy is associated with a first node, further comprising:
   transmitting, along an inter-node RF communication channel, the HTTP/HTTPS request to a second HTTP/HTTPS proxy associated with a second node;
   receiving, from the second HTTP/HTTPS proxy, a response to the HTTP/HTTPS request.

8. The computer-implemented method of claim 1, further comprising:
   receiving, at the HTTP/HTTPS reverse proxy, an HTTP/HTTPS response from the endpoint;
   transmitting, along an upstream RF communication channel, the HTTP/HTTPS response;
   determining, at the HTTP/HTTPS proxy, the client associated with the HTTP/HTTPS response; and
   transmitting, to the client, the HTTP/HTTPS response.

9. The computer-implemented method of claim 1, wherein the endpoint includes one or more resources associated with a ground server accessible via a TCP/IP connection.

10. A system, comprising:
    at least one processor; and
    memory including instructions that, when executed by the at least one processor, cause the system to:
      receive, at a hypertext transfer protocol/hypertext transfer protocol secure (HTTP/HTTPS) proxy, an HTTP/HTTPS request associated with a client;
      generate a transmission and routing packet including at least the HTTP/HTTPS request and a session identifier (ID) for the HTTP/HTTPS request;
      transmit, along a downstream radio frequency (RF) communication channel, the packet;
      determine, at an HTTP/HTTPS reverse proxy, an endpoint for the HTTP/HTTPS request;
      form a connection to the endpoint on behalf of the client; and
      transmit, to the endpoint, the HTTP/HTTPS request.

11. The system of claim 10, wherein the instructions when executed further cause the system to:
    add, to the HTTP/HTTPS request, the session ID;
    remove the session ID prior to transmitting the HTTP/HTTPS request to the endpoint.

12. The system of claim 10, wherein the HTTP/HTTPS proxy is associated with a non-terrestrial relay and the HTTP/HTTPS reverse proxy is associated with a ground relay.

13. The system of claim 10, wherein the instructions when executed further cause the system to:
    receive a plurality of HTTP/HTTPS requests;
    encapsulate the plurality of HTTP/HTTPS requests into the transmission and routing packet.

14. The system of claim 10, wherein the instructions when executed further cause the system to:
    establish a timeout value for the connection, the timeout value corresponding to a period of time to maintain the connection between one or more additional HTTP/HTTPS requests between the client and the endpoint.

15. The system of claim 10, wherein the instructions when executed further cause the system to:
- receive, at the HTTP/HTTPS reverse proxy, an HTTP/HTTPS response from the endpoint;
- transmit, along an upstream RF communication channel, the HTTP/HTTPS response;
- determine, at the HTTP/HTTPS proxy, the client associated with the HTTP/HTTPS response; and
- transmit, to the client, the HTTP/HTTPS response.

16. A non-transitory computer-readable storage medium storing instructions that, when executed by a processor of a computing device, cause the computing device to:
- receive, at a hypertext transfer protocol/hypertext transfer protocol secure (HTTP/HTTPS) proxy, an HTTP/HTTPS request associated with a client;
- generate a transmission and routing packet including at least the HTTP/HTTPS request and a session identifier (ID) for the HTTP/HTTPS request;
- transmit, along a downstream radio frequency (RF) communication channel, the packet;
- determine, at an HTTP/HTTPS reverse proxy, an endpoint for the HTTP/HTTPS request;
- form a connection to the endpoint on behalf of the client; and
- transmit, to the endpoint, the HTTP/HTTPS request.

17. The non-transitory computer-readable storage medium of claim 16, wherein the instructions when executed further cause the computing device to:
- add, to the HTTP/HTTPS request, the session ID; and
- remove the session ID prior to transmitting the HTTP/HTTPS request to the endpoint.

18. The non-transitory computer-readable storage medium of claim 16, wherein the HTTP/HTTPS proxy is associated with a non-terrestrial relay and the HTTP/HTTPS reverse proxy is associated with a ground relay.

19. The non-transitory computer-readable storage medium of claim 16, wherein the instructions when executed further cause the computing device to:
- receive a plurality of HTTP/HTTPS requests;
- encapsulate the plurality of HTTP/HTTPS requests into the transmission and routing packet.

20. The non-transitory computer-readable storage medium of claim 16, wherein the instructions when executed further cause the computing device to:
- establish a timeout value for the connection, the timeout value corresponding to a period of time to maintain the connection between one or more additional HTTP/HTTPS requests between the client and the endpoint.

* * * * *